United States Patent
Amiri et al.

(10) Patent No.: US 9,542,169 B2
(45) Date of Patent: *Jan. 10, 2017

(54) GENERATING SIMD CODE FROM CODE STATEMENTS THAT INCLUDE NON-ISOMORPHIC CODE STATEMENTS

(71) Applicant: International Business Machines Corporation, Armonk, NY (US)

(72) Inventors: Ehsan Amiri, Seattle, WA (US); Christopher M. Barton, Stouffville (CA); Denis M. Palmeiro, Milton (CA); Raul Silvera, Dublin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,567

(22) Filed: Aug. 5, 2015

(65) Prior Publication Data

US 2015/0339110 A1    Nov. 26, 2015

Related U.S. Application Data

(63) Continuation of application No. 14/138,424, filed on Dec. 23, 2013.

(51) Int. Cl.
*G06F 9/45* (2006.01)
*G06F 17/30* (2006.01)

(52) U.S. Cl.
CPC ................. *G06F 8/443* (2013.01)

(58) Field of Classification Search
CPC ........ G06F 8/4452; G06F 8/445; G06F 8/443; G06F 8/447; G06F 8/452; G06F 8/456; G06F 9/30032
See application file for complete search history.

(56) References Cited

U.S. PATENT DOCUMENTS 6,113,650 A * 9/2000 Sakai ................... G06F 8/4442
                                                    711/201
6,266,758 B1 * 7/2001 van Hook ................ G06F 5/00
                                                    712/2

(Continued)

FOREIGN PATENT DOCUMENTS

CN        104731556 A      6/2014

OTHER PUBLICATIONS

Karrenberg et al., "Whole-Function Vectorization", 978-1-61284-357-5/11, 2011, IEEE, pp. 141-150.

(Continued)

*Primary Examiner* — Thuy Dao
(74) *Attorney, Agent, or Firm* — David Zwick

(57) ABSTRACT

Generating SIMD code from code statements that include non-isomorphic code statements. Code statements are received, each code statement has one or more operators in a respective operator order and each operator has a type and associated operands. At least two code statements among the code statements received have an operator of the same type in a different operator order position. A first operator order position is identified for the operators of the same type in each of the code statements. For each of the code statements, code is generated for operators and their associated operands having operator order positions preceding the first operator order positions. SIMD code is generated at least based on the identified first operator order positions, the corresponding operator type, and the operands associated with the operator type at the identified first operator order positions.

5 Claims, 16 Drawing Sheets

(56) References Cited

U.S. PATENT DOCUMENTS

| | | | |
|---|---|---|---|
| 7,937,559 B1 | 5/2011 | Parameswar et al. | |
| 8,060,857 B2 | 11/2011 | Biggerstaff | |
| 8,136,105 B2 | 3/2012 | Eichenberger et al. | |
| 8,151,254 B2 | 4/2012 | Heishi et al. | |
| 8,196,124 B2 | 6/2012 | Eichenberger et al. | |
| 8,200,940 B1* | 6/2012 | Lindholm | G06F 9/5066 345/418 |
| 8,266,587 B2 | 9/2012 | Eichenberger et al. | |
| 8,276,130 B2 | 9/2012 | Wang et al. | |
| 9,047,094 B2 | 6/2015 | Knowles | |
| 2005/0273770 A1* | 12/2005 | Eichenberger | G06F 8/4452 717/136 |
| 2005/0283769 A1* | 12/2005 | Eichenberger | G06F 8/4452 717/151 |
| 2006/0195828 A1 | 8/2006 | Nishi | |
| 2008/0034357 A1* | 2/2008 | Gschwind | G06F 8/445 717/149 |
| 2008/0052693 A1* | 2/2008 | Archambault | G06F 8/443 717/151 |
| 2009/0171919 A1* | 7/2009 | Eichenberger | G06F 8/456 |
| 2010/0011339 A1* | 1/2010 | Eichenberger | G06F 8/456 717/106 |
| 2011/0154307 A1* | 6/2011 | Upton | G06T 11/40 717/146 |
| 2012/0023316 A1* | 1/2012 | Flachs | G06F 9/30065 712/241 |
| 2012/0079469 A1* | 3/2012 | Gonion | G06F 8/456 717/160 |
| 2012/0159428 A1* | 6/2012 | Park | G06F 8/36 717/104 |
| 2013/0262835 A1* | 10/2013 | Arakawa | G06F 8/445 712/220 |
| 2015/0178056 A1* | 6/2015 | Amiri | G06F 8/443 717/151 |
| 2015/0277874 A1 | 10/2015 | Haraguchi | |

OTHER PUBLICATIONS

Larsen et al., "Exploiting Superword Level Parallelism with Multimedia Instruction Sets", PLDI 2000, Vancouver, British Columbia, Canada. Copyright 2000 ACM, 1-58113-199-2/00/0006, pp. 1-12.

U.S. Appl. No. 14/138,424, titled "Generating SIMD Code From Code Statements That Include Non-Isomorphic Code Statements ," filed Dec. 23, 2013, pp. 1-54.

Zhou et al., "Implementing Database Operations Using SIM D Instructions", ACM SIGMOD Jun. 4-6, 2002, Madison, WI, 12 pages.

Leiba et al., "Extending a C-Like Language for Portable SIMD Programming", PPoPP, Feb. 25-29, 2012, New Orleans, 10 pages.

Kong et al., "When Polyhedral Transformations Meet SIMD Code Generation", PLDI, Jun. 16-19, 2013, Seattle, WA, 12 pages.

* cited by examiner

SCALAR CODE STATEMENTS

110a — X[1] = (R[1] * S[1]) / (A * C)
110b — X[2] = (R[2] * S[2]) / (D + F)
110c — X[3] = (R[3] * S[3]) / ((H + I) * J)
110d — X[4] = (R[4] * S[4]) / ((K + L) * M)

DATA PARALLEL OPPORTUNITIES (a,3) (b,3) (c,3) (d,3) — 190a
(a,6) (c,8) (d,8) — 190b
(b,6) (c,6) (d,6) — 190c
(a,7) (b,7) (c,9) (d,9) — 190d
(a,9) (b,9) (c,11) (d,11) — 190e

| | Column 1 | Column 2 | Column 3 | Column 4 | Column 5 | Column 6 | Column 7 | Column 8 | Column 9 | Column 10 | Column 11 |
|---|---|---|---|---|---|---|---|---|---|---|---|
| RowA | R[1] | S[1] | * | A | C | * | / | X[1] | STR | | |
| RowB | R[2] | S[2] | * | D | F | + | / | X[2] | STR | | |
| RowC | R[3] | S[3] | * | H | I | + | J | * | / | X[3] | STR |
| RowD | R[4] | S[4] | * | K | L | + | M | * | / | X[4] | STR |

FIG. 1

GENERATING SIMD CODE FROM CODE STATEMENTS THAT INCLUDE NON-ISOMORPHIC CODE STATEMENTS

BACKGROUND

The present disclosure relates generally to software development tools for code generation and more particularly to compiling code for execution on a machine configured for Single Instruction Multiple Data (SIMD) execution.

SIMD configured computers include multiple processing elements that perform the same operation on multiple data points simultaneously. SIMD processing elements are typically used to add or multiply sets of numbers at the same time for multimedia encoding and rendering as well as scientific applications. Implementing an algorithm with SIMD instructions, without compiler support, may require the user to be aware of restrictions on data alignment, architecture specific instruction sets and SIMD register sizes. Compilers may allow the user to exploit the speed of the SIMD processing elements by generating SIMD-enabled code from a user's scalar code.

SUMMARY

Embodiments of the present disclosure disclose a method, computer program product, and system for generating SIMD code from code statements that include non-isomorphic code statements. One or more processors receive a plurality of code statements, each code statement has one or more operators in a respective operator order. Each operator has a type and associated operands. At least two code statements of the plurality of code statements have an operator of the same type in a different operator order position. The one or more processors identifies a first operator order position for the operators of the same type in each of the at least two code statements. For each of the at least two code statements, the one or more processors generates code for operators and their associated operands having operator order positions preceding the first operator order positions. The one or more processors generates SIMD code at least based on the identified first operator order positions, the corresponding operator type, and the operands associated with the operator type at the identified operator order positions.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary pack, showing a data parallel representation of scalar code statements and data parallel opportunities for the scalar code statements, in accordance with an embodiment of the disclosure;

DETAILED DESCRIPTION

Figure 2:
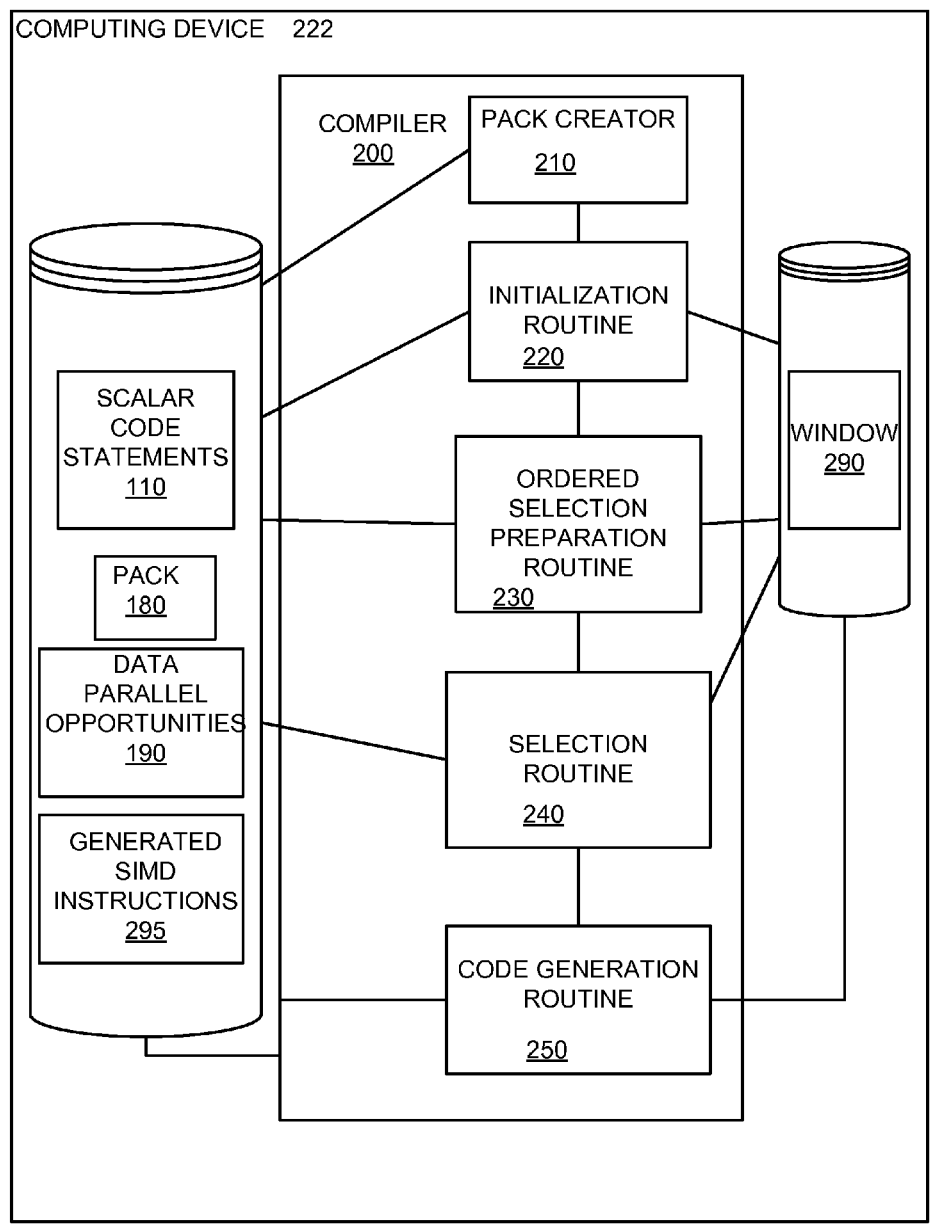
FIG. 2 illustrates a functional block diagram of a SIMD optimizing compiler environment, in accordance with an embodiment of the disclosure.

In computing, a basic block of code is a portion of code within a program with only one entry point and only one exit point. Compilers typically decompose programs into their basic blocks as a first step to generating compiled code. Typical compilers that generate SIMD-enabled code, generate the SIMD-enabled code from "isomorphic" code patterns within a basic block of scalar code. An isomorphic code pattern exists when multiple code statements, or isomorphic code statements, in a basic block of code all contain the same operators (e.g. multiplication) in the same order in the multiple code statements and the operators are applied to memory adjacent operands. Some compilers may decompose a body of code in a loop into a basic block by peeling and unrolling the loop, as a way to identify isomorphic code statements in the unrolled loop body. Such isomorphic code statements may represent data parallel opportunities for the compiler to optimize with SIMD instructions.

Embodiments of the present disclosure may allow a compiler to extend data parallel opportunities for SIMD optimization. Various embodiments may advantageously optimize code from non-isomorphic code statements, as well as isomorphic code statements, to generate SIMD instructions. Embodiments of the present disclosure may utilize a data parallel representation of scalar code, hereinafter referred to as a "pack", to generate SIMD-enabled code. Unlike typical compilers that pack only code statements from isomorphic scalar code, certain embodiments of the disclosure may pack data parallel representations for both isomorphic and non-isomorphic statements.

FIG. 1 illustrates an exemplary pack 180, showing a data parallel representation of both isomorphic and non-isomorphic scalar code statements 110 and data parallel opportunities 190 for the scalar code statements 110, in accordance with an embodiment of the disclosure. As will be described in detail below, pack creator 210 creates pack 180 and data parallel opportunities 190 from scalar code statements 110.

In an embodiment, each scalar code statement 110a-110d may be represented in pack 180 as a statement array, such as RowA-RowD. The operators in the statement arrays may have an operator positional order the array. In an embodiment, each statement array may be a post-order representation of the statement tree with the lower indices of the statement array on the left side, and the higher indices on the right side. Each statement array may be represented by a row in pack 180, for example, RowA to RowD, and ordered to maintain the original order of the scalar code statements in the basic block. For example, RowA represents scalar code statement 110a, RowB represents scalar code statement 110b, etc. As illustrated, pack 180 is an exemplary post-order representation of the statement trees for scalar code statements 110a-110d. In the exemplary embodiment, all operands are located to the left of their corresponding operator. Other embodiments may locate the operands in locations other than to the left of their operators, even locations outside of pack 180, so long as the operand locations may be determined for each operator in pack 180. Certain embodiments may include information in pack 180 indicating operand data type, operand location, and processed indicators for each statement array and each operator in each statement array. Statement arrays and operators are considered processed after compiled code has been generated for them.

In an embodiment, pack 180 may include non-linearized address expressions, as well as linearized address expressions, as operands. For example, the operand "R[1]" located at (RowA, Column 1) in pack 180, representing, for example, an address within an array, is an exemplary non-linearized address expression. Non-linearized address expressions may be resolved during code generation. Various embodiments may create a pack such that every statement array in the pack has a data parallel opportunity with its adjacent statement array. Certain embodiments may limit the size of a pack to include only enough statement arrays to fill a SIMD register with one operand from each statement array.

Data parallel opportunities 190 represent opportunities in pack 180 for SIMD optimization and may represent those opportunities as operator locations in pack 180, hereinafter referred to as "operator matches" Each set of operator matches 190a-190e in data parallel opportunities 190 represent locations of identical operators from one or more statement arrays in pack 180. Each set of operator matches 190a-190e may include at most one operator match from each of the statement arrays in pack 180. The exemplary set of operator matches 190a in data parallel opportunity 190 matches the multiplication operators of pack 180 location (RowA, Column 3) with the multiplication operators of pack 180 locations (RowB, Column 3), (RowC, Column 3), and (RowD, Column 3) as a potential set of scalar instruction operators that may be optimized into one SIMD instruction. Certain embodiments may embed the data parallel opportunities in pack 180.

Various compiler embodiments may optimize all, none or a subset of the matched operators 190a-190e from data parallel opportunities 190 into a SIMD instruction. Considerations for selecting which matched operators from data parallel opportunities 190 to optimize into a SIMD instruction may include, but are not limited to, operand data type, architected SIMD register size, order preservation of the original scalar code, and cost of gathering and scattering operands of the operators of the SIMD register. Various compiler embodiments may generate code that optimizes the data parallel opportunities 190 into a single SIMD instruction, multiple SIMD instructions, a combination of both SIMD and scalar instructions, or a sequence of scalar instructions.

Figure 15:
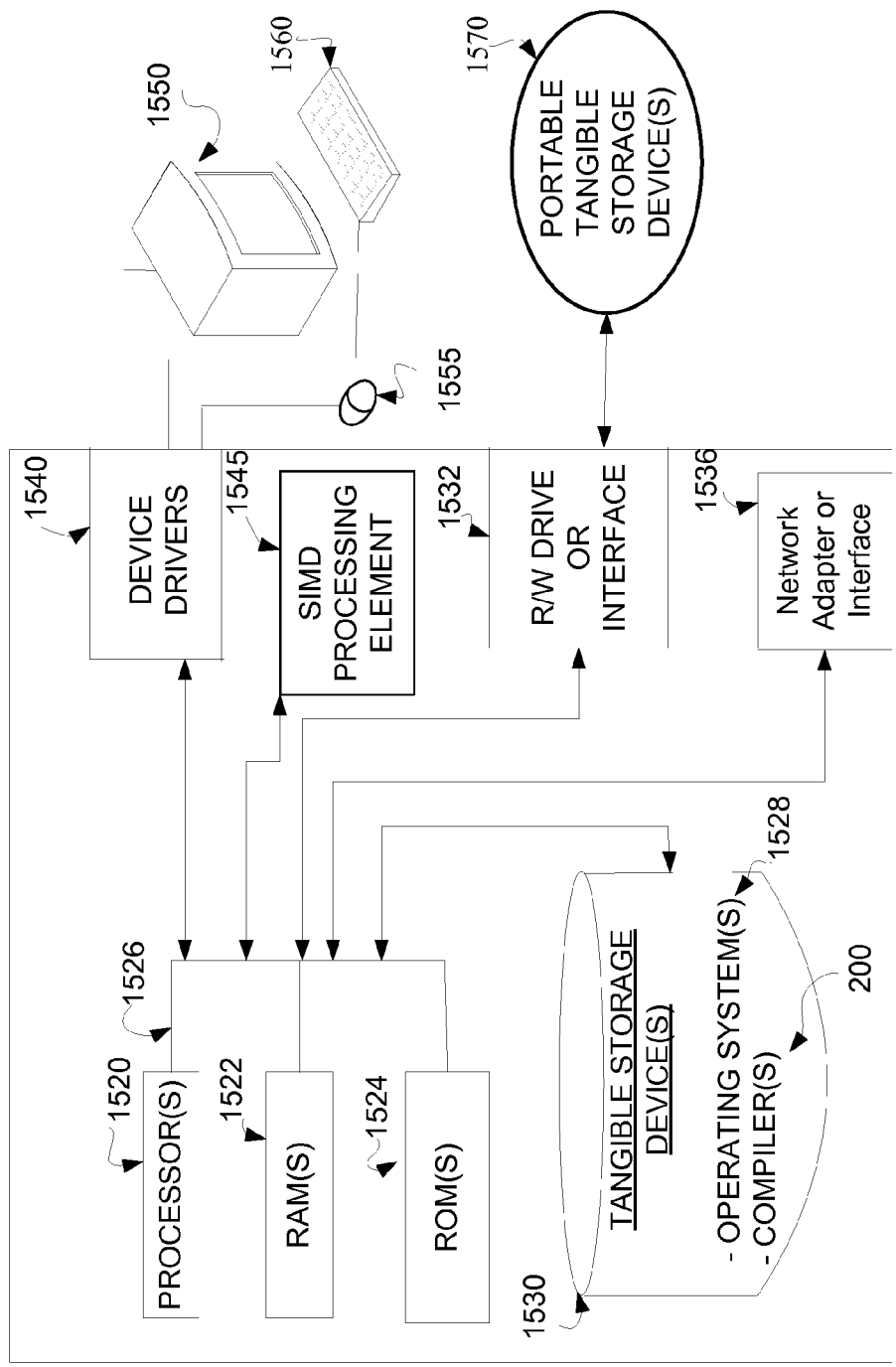
FIG. 15 depicts a block diagram of components of the computing device of a SIMD optimizing compiler environment, in accordance with an embodiment of the disclosure.

FIG. 2 illustrates a functional block diagram of a SIMD optimizing compiler environment 299, in accordance with an embodiment of the disclosure. SIMD optimizing compiler environment 299 includes computing device 222. Computing device 222 represents a computing device, system, or environment that includes compiler 200 and storage for the scalar code statements 110, pack 180, data parallel opportunities 190, window 290, and generated SIMD code instructions 295, all of which may be stored, for example, on a tangible storage device, such as tangible storage device(s) 1530 (FIG. 15) or removable tangible storage devices(s) 1570 (FIG. 15).

Computing device 222 may be a laptop computer, a notebook computer, a personal computer (PC), a desktop computer, a tablet computer, a thin client, or any other electronic device or computing system capable of performing the required functionality of embodiments of the disclosure. Computing device 222 may include internal and external hardware components, as depicted and described in further detail with respect to FIG. 15. In other various embodiments of the present disclosure, computing device 222 may represent a computing system utilizing clustered computers and components to act as a single pool of seamless resources. In general, computing device 222 is representative of any programmable electronic device or combination of programmable electronic devices capable of executing machine-readable program instructions in accordance with an embodiment of the disclosure.

Compiler 200, in computing device 222, may include pack creator 210, initialization routine 220, ordered selection preparation routine 230, selection routine 240, and code generation routine 250. In the embodiment, compiler 200 accesses scalar code statements 110 and creates pack 180, data parallel opportunities 190, and window 290 and generates SIMD-enabled code 295. An embodiment of compiler 200 may generate SIMD-enabled code 295 based on compiler parameters identifying a SIMD architecture for which the generated code may be enabled. Computing device 222 may be configured with a SIMD processing element 1545 (FIG. 15) and other embodiments may generate SIMD-enabled code for the SIMD architecture of computing device 222.

In an embodiment, pack creator 210 may decompose a computer program being compiled, by compiler 200, into basic blocks and analyze the basic blocks to identify scalar code statements that may present opportunities for SIMD optimization. Pack creator 210 may identify all possible opportunities for SIMD optimization from both isomorphic statements and non-isomorphic statements among the program's scalar code statements. Pack creator 210 may identify opportunities for SIMD optimization without regard to operand memory location. For example, the identified data parallel opportunities 190 may include operators with associated operands that are not adjacent in memory, or non-memory adjacent. Various embodiments of pack creator 210 may initially ignore the location of operands and gather all functionally possible opportunities for SIMD optimization. Pack creator 210 may later prioritize from among the initial possible opportunities for SIMD optimization, taking operator memory locations into account. Pack creator 210 may create pack 180 representing all the identified scalar code statements that have opportunities for SIMD optimization from the analyzed basic block of code. Pack creator 210 may also create data parallel opportunities 190, locating operators within the scalar code statements represented in pack 180, that have been identified as potential opportunities for SIMD optimization. The location of the created pack 180 and data parallel opportunities 190 may be passed to initialization routine 220.

Figure 4:
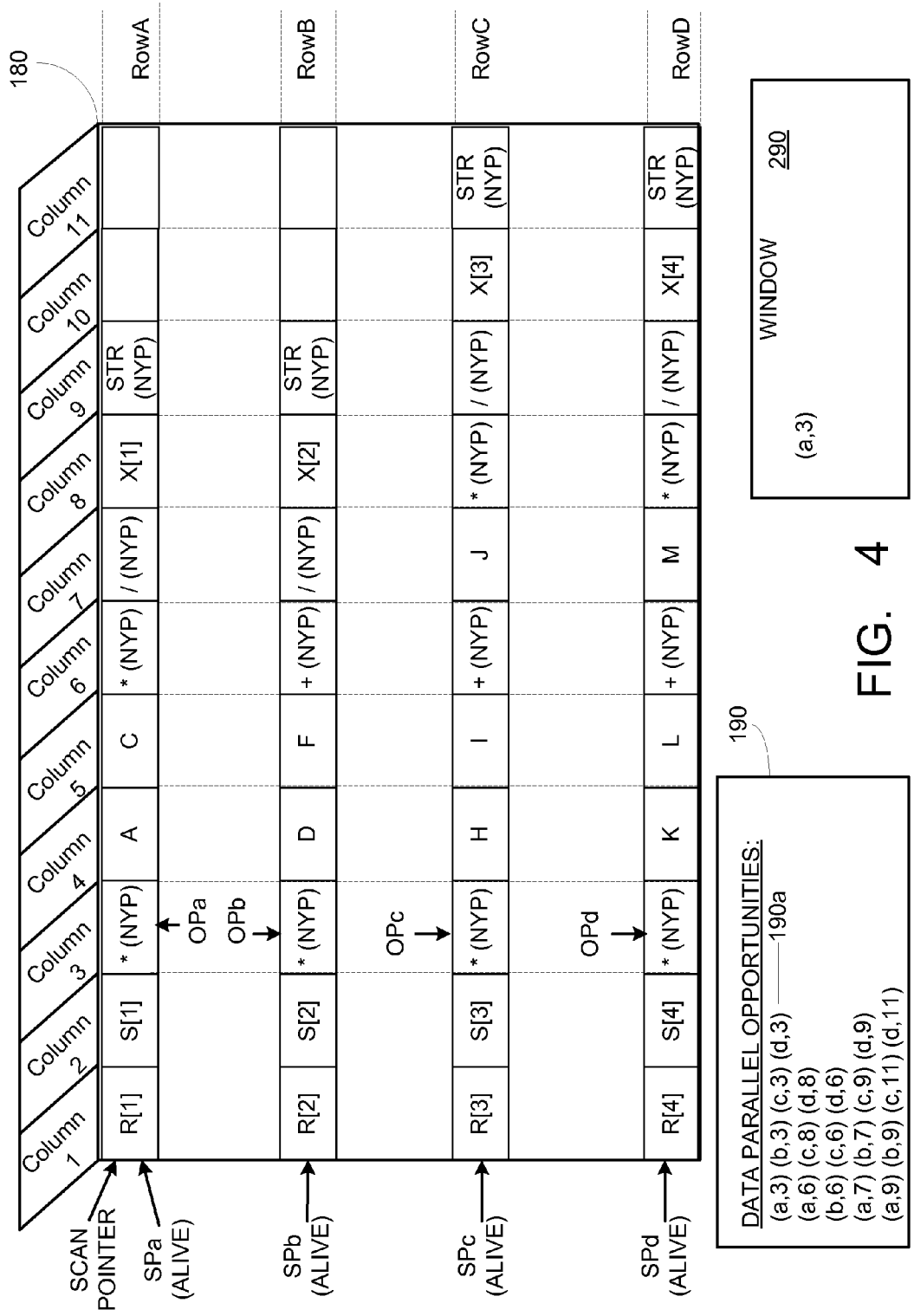
FIG. 4 is a diagram of an exemplary pack, in accordance with an embodiment of the disclosure.

In an embodiment, initialization routine 220 receives pack 180 and data parallel opportunities 190, creates window 290, and initializes various pointers and values, described below, that are used to select which operator matches among the data parallel opportunities 190 to optimize. With reference to FIG. 4, initialization routine 220 may initialize pointers to each statement array in pack 180, for example statement pointers Spa-SPd and operand pointers OPa-OPd and indicate all statement arrays and operators in pack 180 have not been processed by compiler 200. Certain embodiments may initialize a scan pointer to point to the first statement array in pack 180.

Window 290, created by initialization routine 220, may be utilized by compiler 200 to include selected operator matches, from among the data parallel opportunities 190, to be optimized into a SIMD instruction. Window 290 may be repeatedly filled and emptied during the processing of pack 180 and the generation of compiled code. The structure of window 290 may include, but is not limited to, an array, a set of arrays, a linked list, a set of linked lists, and a simple list. One window 290 may service pack 180.

In an embodiment, ordered selection preparation routine 230 initially receives control from initialization routine 220 with an empty window 290 created, pack 180 created, a scan pointer initialized, statement array pointers initialized, and all statement arrays and operators marked as not having been processed. Ordered selection preparation routine 230 may prepare additional pointers, initialize window 290, and set pack 180 search limits in preparation for selection routine 240, described in more detail below.

Ordered selection preparation routine 230 may determine where, in pack 180, the selection of data parallel opportunities to be optimized into SIMD code instructions may begin and set appropriate pointers. Ordered selection preparation routine 230 may also set search limits determining where in pack 180 the selection of data parallel opportunities to be optimized into SIMD instructions may end. The search limits may be determined by size of the SIMD register that will be used in the generated SIMD instruction. The SIMD register size determines the maximum number of operands that may be optimized into one SIMD instruction and therefore the maximum number of statement arrays to be searched. For example, if four operands fit in a SIMD register, the search limit may be four statement arrays, allowing one operand from each statement array to be optimized. Certain embodiments may not limit the number of statement arrays to be searched, but may instead limit the number of operators selected for optimization, thereby allowing operands from non-adjacent statement arrays to be optimized into one SIMD instruction. Ordered selection preparation routine 230 may initialize window 290 with the operator location in pack 180 to be optimized. In various embodiments, ordered selection preparation routine 230 may execute each time pack creator 210 creates a new pack, after each SIMD instruction is generated, and whenever a search of pack 180 is halted by selection routine 240, which will be described in more detail below with reference to FIGS. 5a and 5b. Ordered selection preparation routine 230 may also determine when all operators in pack 180 have been processed.

In an embodiment, ordered selection preparation routine 230 may receive a newly created pack 180 which includes a plurality of statement arrays all marked as not-completely-processed, hereinafter "ALIVE", statement pointers SPa-SPd (FIG. 4) each pointing to the beginning of their respective statement arrays, each operator in each statement array marked as not-yet-processed (NYP), and an initialized scan pointer pointing to the first statement array in pack 180.

Ordered selection preparation routine 230 may alternatively receive a pack 180 that has already been searched at least once and includes the plurality of statement arrays, each marked either completely-processed, hereinafter "NOT-ALIVE" or ALIVE, as appropriate. Statement pointers SPa, SPb, SPc, SPd each point to their respective statement array. Operator pointers OPa, OPb, OPc, OPd each point to an operator in their respective statement array, the operator marked either processed or not-yet-processed (NYP). The scan pointer may point to the first statement array in pack 180, after a SIMD instruction has been generated, or may point to the beginning of any of the plurality of statement arrays in pack 180 whenever a search of pack 180 has been halted by selection routine 240. Upon entry to ordered selection preparation routine 230, window 290 may be empty.

Figure 3:
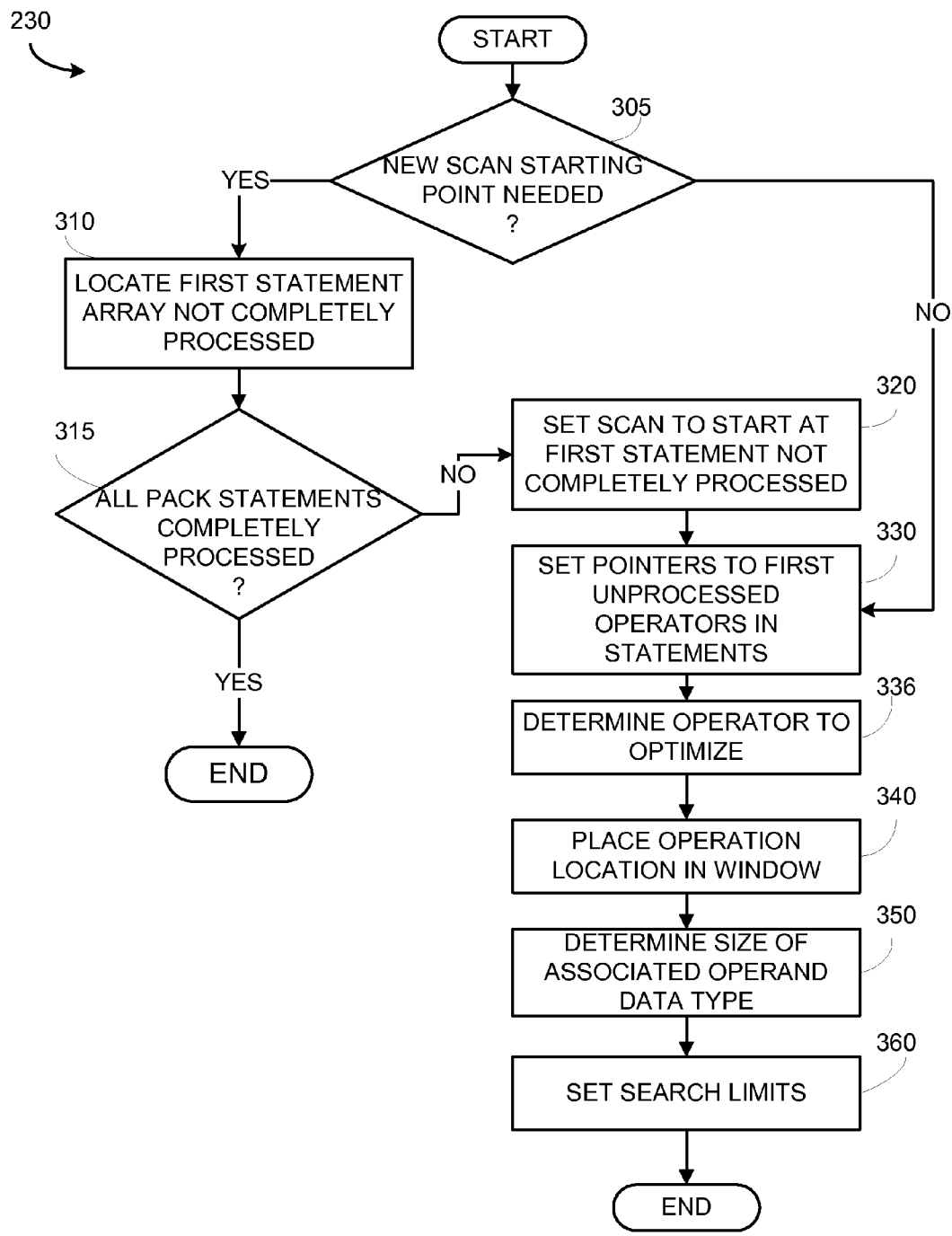
FIG. 3 is a flowchart illustrating the operation of ordered selection preparation routine, in accordance with an embodiment of the disclosure.

FIG. 3 is a flowchart illustrating the operation of ordered selection preparation routine 230, in accordance with an embodiment of the disclosure. Ordered selection preparation routine 230 may determine, at 305, whether a scan pointer, set either by initialization routine 220 or selection routine 240, described below with reference to FIGS. 5a and 5b, received on entry needs to be initialized. In an embodiment, a scan pointer that points to the first statement array in pack 180 on entry may indicate the scan pointer needs to be initialized. For a scan pointer that needs to be initialized, ordered selection preparation routine 230 may locate, at 310, the first, or lowest indexed, statement array in the pack 180 marked as ALIVE, for example, RowA in FIG. 4. When all statement arrays in pack 180 are marked NOT-ALIVE, as determined at 315, all operators in pack 180 have been processed and code has been generated for all the scalar code statements 110 represented by pack 180. If at least one statement array in pack 180 is marked ALIVE, as determined at 315, ordered selection preparation routine 230 may set the scan pointer, at 320, to point to the lowest indexed statement array in pack 180 that is marked ALIVE, for example RowA in FIG. 4. For a newly created pack 180, as shown in FIG. 4, the exemplary scan pointer may always be initialized to point to the first statement array. Once the scan pointer is set, either because initialization may not be needed (after a halted search of pack 180), as determined at 305, or because initialization was completed at 320, ordered selection preparation routine 230 may, at 330, set the operator pointers OPa, OPb, OPc, OPd for each statement array in pack 180 to point to the lowest indexed operator marked not-yet-processed (NYP) in each respective statement array. For a newly created pack 180, as shown in FIG. 4, the exemplary operator pointers OPa, OPb, OPc, OPd point to the lowest indexed operators in their respective statement arrays, because all the operators in a newly created pack 180, as shown in FIG. 4, are marked NYP. Ordered selection preparation routine 230 may determine the operator to be optimized, at 336. The operator to be optimized may be the lowest indexed operator marked NYP in the statement array pointed to by the scan pointer. In exemplary newly created pack 180, as shown in FIG. 4, the operator to be optimized is the multiplication operator at location (SPa, Column3) or abbreviated as "(a, 3)" in data parallel opportunities 190. Ordered selection preparation routine 230 may, at 340, add the location of the operator to be optimized to window 290, as shown in FIG. 4. Ordered selection preparation routine 230 may, at 350, determine the size of the data type of the operands associated with the operator added to window 290 and may utilize size to set search limits, at 360. The search limits may minimize search time by limiting the number of pack 180 statement arrays searched. Ordered selection preparation routine 230 may then pass control to selection routine 240.

Returning to FIG. 2, selection routine 240 receives control from ordered selection preparation routine 230 with an initialized scan pointer, a pack 180 in which all statement arrays and operators indicate whether or not they have been processed, initialized operator pointers pointing to the lowest indexed NYP operator in each statement array, initialized scan limits, and window 290 initialized with the location of the operator that is to be optimized into a SIMD instruction. Selection routine 240 searches pack 180 for operator matches for the operator initialized in window 290, from among the data parallel opportunities 190 and adds the selected operator match locations to window 290 to be utilized by code generation routine 250 to generate the optimized SIMD instruction for the selected operator matches.

Certain embodiments of selection routine 240 may only select operator matches, to add to window 290 for optimization, from among the data parallel opportunities 190, whose operator location statement array index is greater than the statement array index of the operator location initialized in window 290 by ordered selection preparation routine 230, thereby generating code that maintains the order of operation, or operator precedence order, of the original scalar code statements 110 represented in pack 180. Selection routine 240 completes when window 290 includes enough matched operators to fill a SIMD register with their operands, when all operator matches, for example 190a (FIG. 4), among the data parallel opportunities 190 for the operator initialized in window 290 have been processed, when the entire pack 180 has been searched, and when the search limit set by ordered selection preparation routine 230 has been reached, even if the operands for the selected data parallel opportunities may not completely fill a SIMD register. Selection routine 240 may halt a selection search, without generating any code, whenever selecting an operator match from among the data parallel opportunities 190 for the operator initialized in window 290 would cause the generation of instructions that do not maintain the order of operation the original scalar code statements 110 represented in pack 180.

Figure 5A:
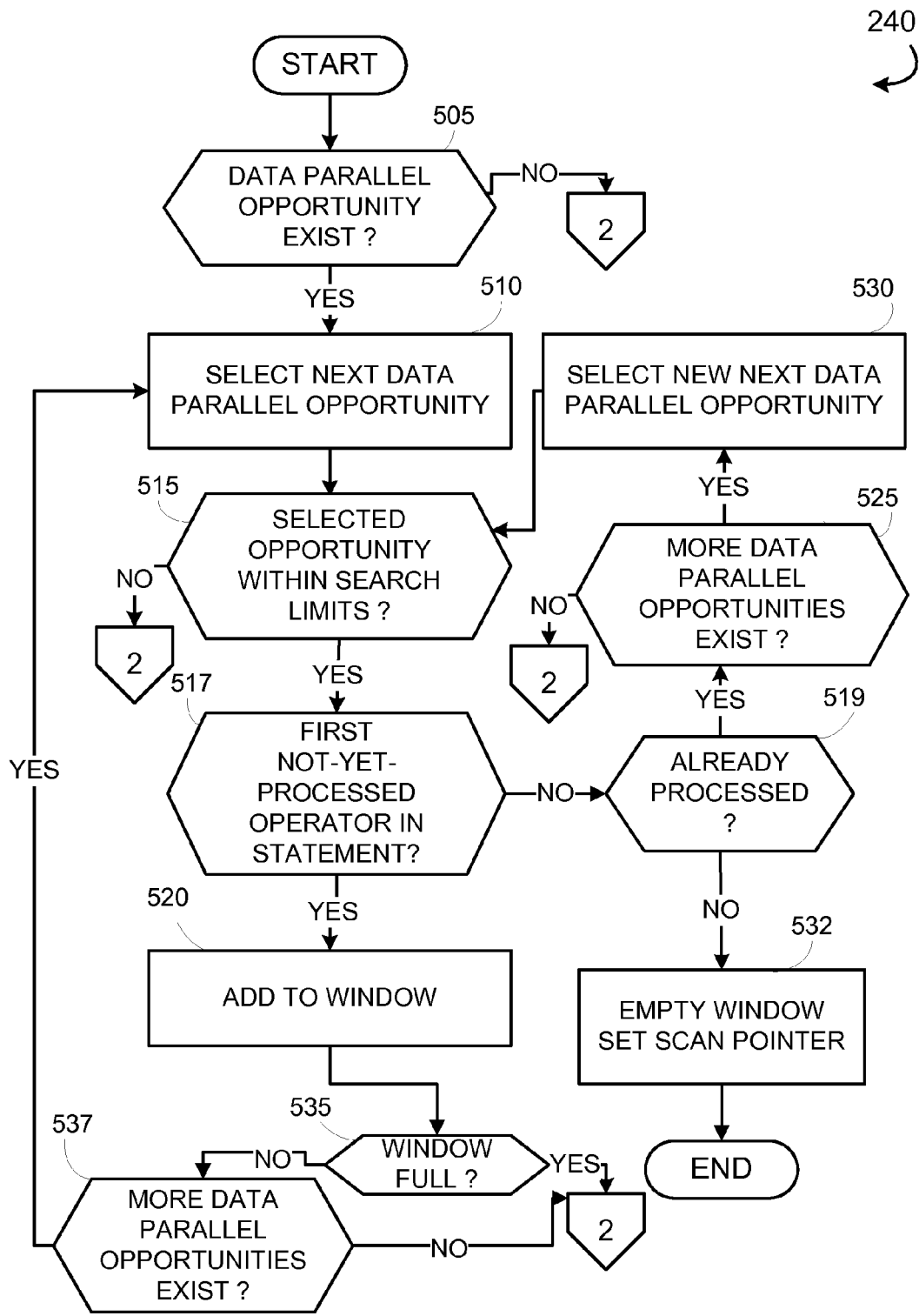
FIGS. 5a and 5b is a flowchart illustrating the operation of selection routine, in accordance with an embodiment of the disclosure.
Figure 5B:
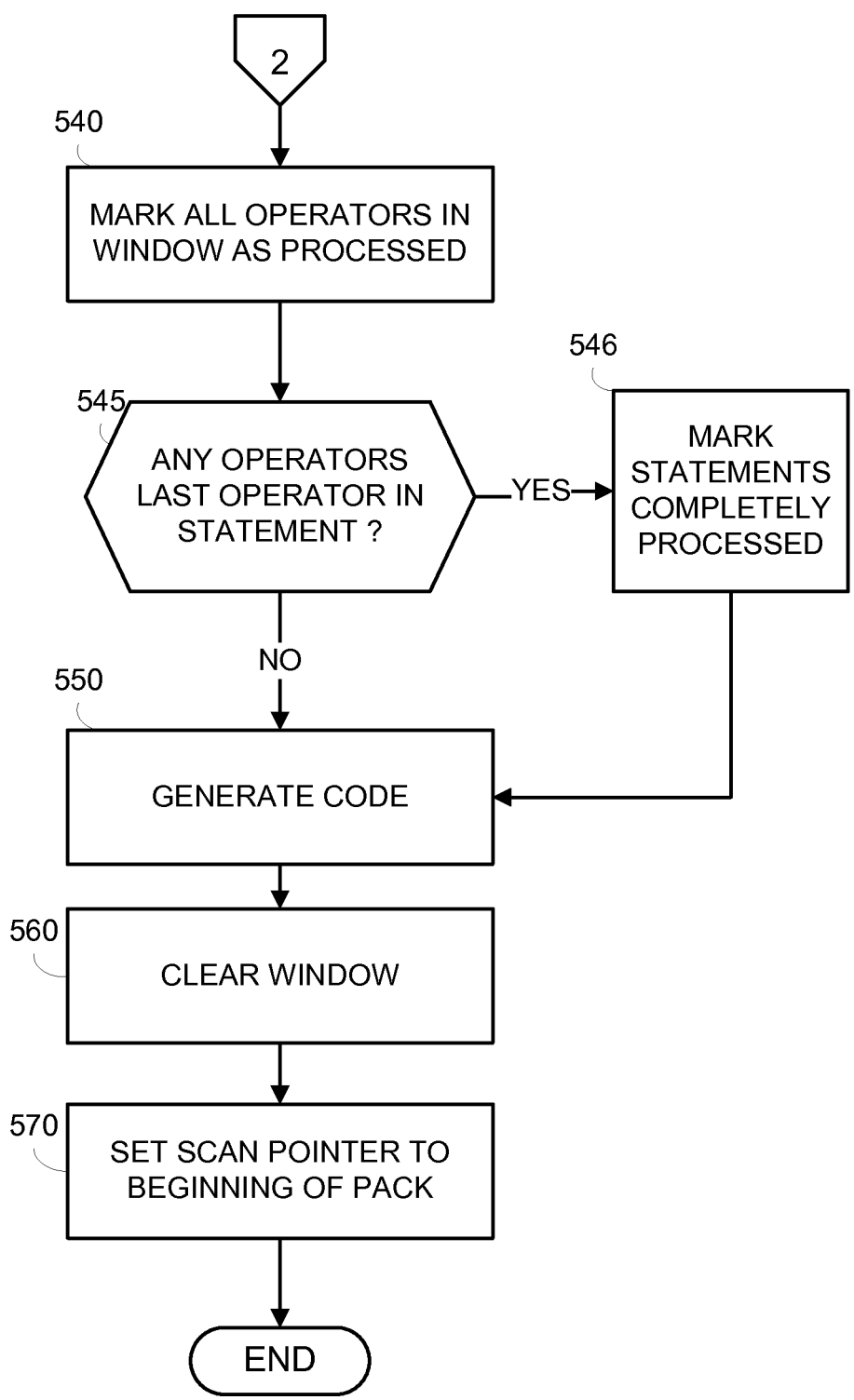

FIGS. 5a and 5b is a flowchart illustrating the operation of selection routine 240, in accordance with an embodiment of the disclosure. Selection routine 240 may determine, at 505, if an operator match exists in data parallel opportunity 190 for the operator whose location was most recently added to window 290. If matched operators exist in data parallel opportunities 190, for example 190a (FIG. 4), as determined at 505, selection routine 240 may select, at 510, the operator match from among the data parallel opportunities 190 whose statement array index is greater than the statement array index of the operator whose location was most recently added to window 290 but whose statement array index is less than the statement array index of the remaining data parallel opportunities 190. For example, in FIG. 4, the operator location most recently added to window 290 is (a, 3); the operator match location meeting the above selection criteria is (b, 3). If the selected operator match is within the scan limits set by ordered selection preparation routine 230, as determined at 515, and the operator represented by the selected operator match is the lowest indexed, NYP operator in its statement array, as determined at 517, selection routine 240 may add, at 520, the operator location of the selected operator match to window 290. In an embodiment, selection routine 240 may determine that the selected operator match is the lowest indexed, NYP operator in a statement array by comparing the selected operator match location to the operator pointer (OPx) for the respective statement array "x". A selected operator match whose location is equal to the location pointed to by the operator pointer (OPx) may be determined to be the lowest indexed NYP operator in the statement array. Exemplary selected operator match location (b, 3) equals the location pointed to by OPb, in FIG. 4.

If the selected operator match is not the lowest indexed NYP operator in the statement array, as determined at 517, selection routine 240 may determine whether the selected operator match has already been processed or whether processing the selected operator match may cause the generation of code that does not maintain the order of operation the original scalar code statements 110 represented in pack 180. In an embodiment, selection routine 240 may make the determination by, again, comparing the selected operator match location with the operand pointer (OPx) for the statement array "x". For a selected operator match location whose column index is less than the column index of operand pointer (OPx), the selected operator match may have already been processed in an earlier search. In an embodiment, selection routine 240 may select only a subset of the data parallel opportunities 190 to optimize in a SIMD instruction during any one selection search of pack 180, bypassing other opportunities until subsequent selection searches. A selected operator match location whose column index is greater than the column index of operand pointer (OPx) may generate code that does not maintain the order of operation the original scalar code statements 110 represented by pack 180 and may cause selection routine 240 to halt the selection scan.

If the selected operator match has already been processed, as determined at 519, selection routine 240 may determine, at 525, if additional operator matches in data parallel opportunities 190 exist. If additional operator matches in data parallel opportunities 190 do exist, as determined at 525, a new operator match from among the data parallel opportunities 190 may be selected at 530 and the selection search continued. The newly selected operator match, selected at 530, may represent the next operator match among the data parallel opportunities 190 whose statement array index is greater than the statement array index of the operator match determined at 519 to be already processed, but is less than the statement array indices of the remaining data parallel opportunities 190.

For a selected operator match that is not the lowest indexed, NYP operator in the statement array, as determined at 517, and has not already been processed, as determined at 519, selection routine 240 may halt the selection search to prevent the generation of code that may not maintain the order of operation the original scalar code 110 represented in pack 180. Selection routine 240 may, at 532, remove all operator locations from window 290 and set the scan pointer to point to the statement array of the operator match causing the halt of the selection search. Execution may continue with ordered selection preparation routine 230 re-initializing pointers and values for a new selection search of pack 180.

Selection routine 240, after adding the operator location of the selected operator match to window 290, at 520, may determine, at 535, if enough operator matches have been added to window 290 to fill the architected SIMD register with their operands. When the operands of the matched operators whose locations are in window 290 will not fill the SIMD register, as determined at 535, and when additional operator matches exist in data parallel opportunities 190, as determined at 537, selection routine 240 may select another data parallel opportunity 190, at 510 and continue the selection search.

When the selection search completes, either because no additional operator matches exist in data parallel opportunities 190 for the operator whose location was most recently added to window 290, as may be determined at 505, 525, and 537, window 290 includes enough matched operators to fill the SIMD register with their operands, as determined at 535, or the operator matches that exist in data parallel opportunities 190 are outside the search limits defined in ordered selection preparation routine 230, as determined at 515, selection routine 240 may mark, at 540, all operator locations in pack 180 that are included in window 290 as processed. For any operators that are the last operators in their respective statement array to be processed, as determined at 545, selection routine 240 may mark the respective statement array as completely-processed or "NOT-ALIVE", at 546. Selection routine 240 may pass, for example, the location of window 290 to code generation routine 250 to generate a SIMD instruction for the operators whose locations are in window 290, at 550. Selection routine 240 may empty window 290, at 560, and set the scan pointer to point to the lowest indexed statement array in pack 180. Execution may continue with ordered selection preparation routine 230 re-initializing pointers and values for a new selection search of pack 180.

Returning to FIG. 2, code generation routine 250 receives control from selection routine 240 to generate SIMD-enabled code for the selected operator matches in window 290. All the operators represented in window 290 are alike, but they come from different scalar code statements. The scalar code statements from which the operator matches were selected may be both isomorphic and non-isomorphic. When generating SIMD enabled code, code generation routine 250 may locate the operands associated with each selected operator. Operands resulting from earlier computations may be stored in temporary variables. The temporary variables may be the operands associated with the corresponding selected operators. The first window 290 received by code generation routine 250 for pack 180 may represent operators with associated operands that are either located in memory or are immediate operands. In subsequent windows 290 received for the same pack 180, the associated operands for those operators may be the temporary variables resulting from the calculations from previous windows 290 received. Code generation routine 250 may store the result of the SIMD instruction in a temporary variable and may associate the symbol index of the temporary variable with each operator whose operator location was in window 290. If the temporary variable is, for example, a vector, code generation routine 250 may additionally associate the particular lane of that vector associated with the particular operator. For a window 290 that contains only one operator location, code generation routine 250 may generate a scalar instruction or may generate a SIMD instruction that uses only one lane of the SIMD registers. In an embodiment, pack creator 210 may indicate, in pack 180, how code generation routine 250 should generate instructions for operators without any data parallel opportunities 190 selected.

Code generation routine 250 may perform analysis on the operands to determine the most efficient gathering of the operands. Code generation routine 250 may determine if the operands for the selected match operators are all located in a contiguous chunk of memory and if so may generate, for example, a vector instruction to load the operands. The load of the operands may be followed by a permute instruction when operands need to be reordered. For non-contiguous operand memory locations, code generation routine 250 may load the operands in scalar instructions, one by one, and generate, for example, a permute or move instruction to locate them in the proper lane of a SIMD register. In another embodiment, an intrinsic instruction, such as the vec_insert intrinsic on IBM's Power Systems platform, may be used. Similar intrinsic instructions may be used on other architecture platforms. Once all operands are loaded, code generation routine 250 may generate the SIMD instruction that applies the operator in window 290, and, for example, place the result in a temporary variable. A CONV operator may generate pack and unpack instructions as are typically used for optimizing a CONV operation with SIMD instructions. Code generation routine 250 may reduce the final number of statements generated by executing a copy propagation pass.

FIGS. 6-14, depict an exemplary processing of pack 180 to select operator matches from among the data parallel opportunities 190 for optimization, in accordance with an embodiment of the disclosure. The depiction is illustrative rather than limiting.

Figure 6:
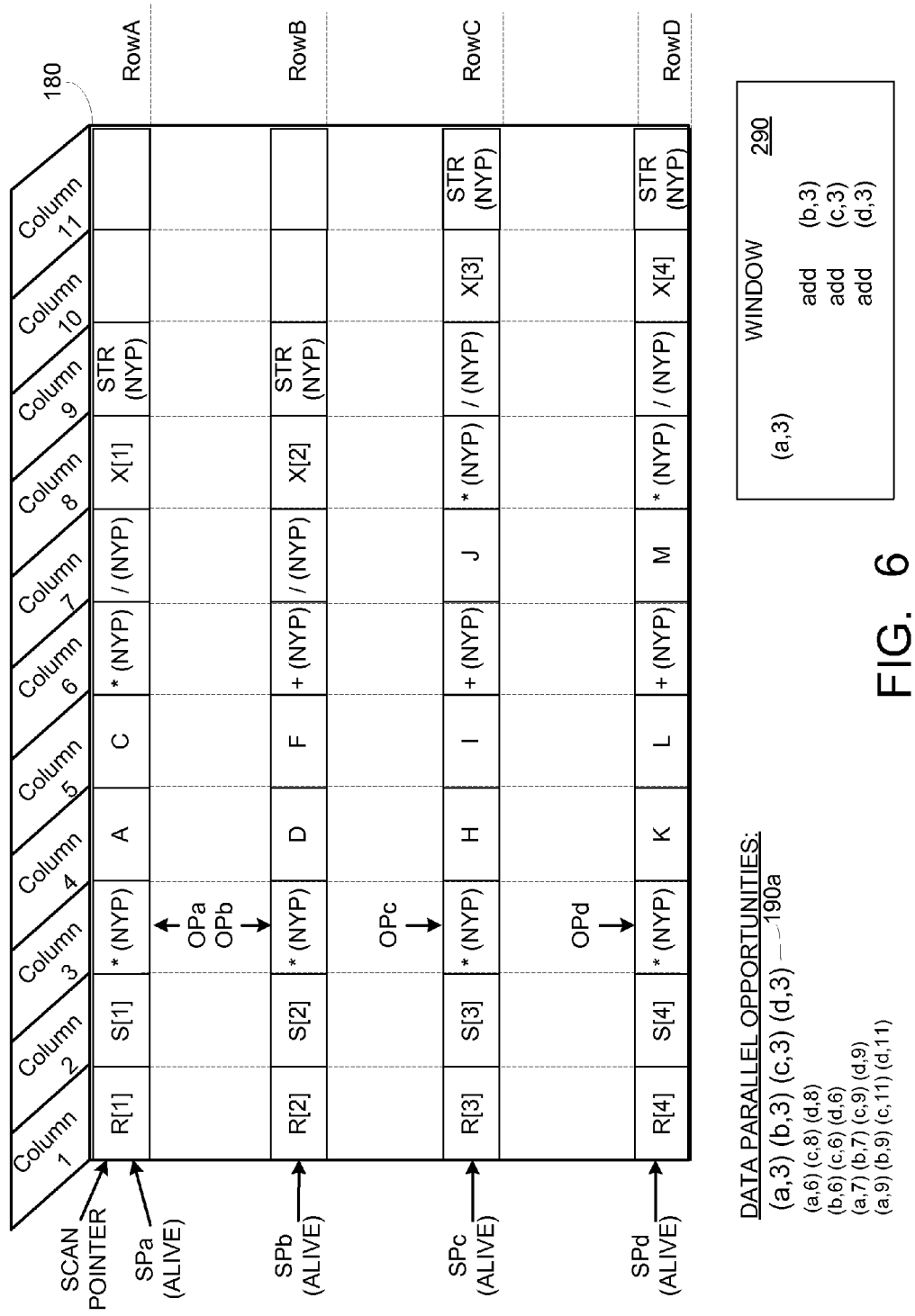
FIGS. 6-14, depict an exemplary processing of a pack to select operator matches from among the data parallel opportunities for optimization, in accordance with an embodiment of the disclosure.

FIG. 6 depicts a new pack 180 created by pack creator 210 (FIG. 2) and initialized by initialization routine 220 with all the statement pointers SPa, SPb, SPc, SPd initialized for the new pack 180, all statement arrays indicating they are ALIVE, and all operators in pack 180 marked as NYP. Ordered selection preparation routine 230 has set the scan pointer to point to the lowest indexed statement array in pack 180, initialized operator pointers OPa, OPb, OPc, OPd to point to the lowest indexed operator of each respective statement array, and initialized window 290 to include the operator location of the lowest indexed NYP operator in the statement array pointed to by the scan pointer, in this example the multiplication operator located in RowA at Column 3. Operators in the statement arrays will hereinafter be referred to by their (row, column) locations, for example (a, 3). In this example, the operand data types associated with the operators determines limits on the number of statement arrays to be searched. This example also assumes all operands in pack 180, including arrays R, S, and X, are integer data types of length four and the SIMD register is sixteen bytes long. Four of the exemplary operands will fit in each of the exemplary SIMD registers, limiting the number of exemplary statement arrays searched to four. In this example when starting a search at RowA, all the statements represented by RowA-RowD may all be searched by selection routine 240.

The exemplary multiplication operator at location (a, 3) initialized into window 290 by ordered selection preparation routine 230, may be matched to multiplication operators at locations (b, 3), (c, 3), and (d, 3) in the set of operator matches 190a in data parallel opportunities 190. Selection routine 240 selects the actual operator matches, from among the set of operator matches 190a, to optimize. Selection routine 240 determines that the operator at location (a, 3) has an operator match (b, 3) in data parallel opportunities 190 and that RowB is within the search limits. Because operator location (b, 3) is the lowest indexed NYP operator in RowB, i.e., location (b, 3) is pointed to by operator pointer OPb, selection routine 240 adds operator location (b, 3) to window 290. Selection routine 240 then determines another operator match (c, 3) exists in data parallel opportunities 190. Because statement array RowC is also within the search limits, and operator location (c, 3) is pointed to by operator pointer OPc, selection routine 240 adds operator location (c, 3) to window 290. Selection routine 240 may repeat the process for operator match (d, 3) in data parallel opportunities 190. Window 290 now includes four operator locations for identical operators, in this example a multiplication operator "*", each with operands of identical data type, for example, integer with a length of four. Window 290 is now sent to code generation routine 250 to generate a SIMD instruction for the multiplication operators located at (a, 3), (b, 3), (c, 3), (d, 3) in pack 180. The operators from window 290 may now all be marked as processed in pack 180.

Figure 7:
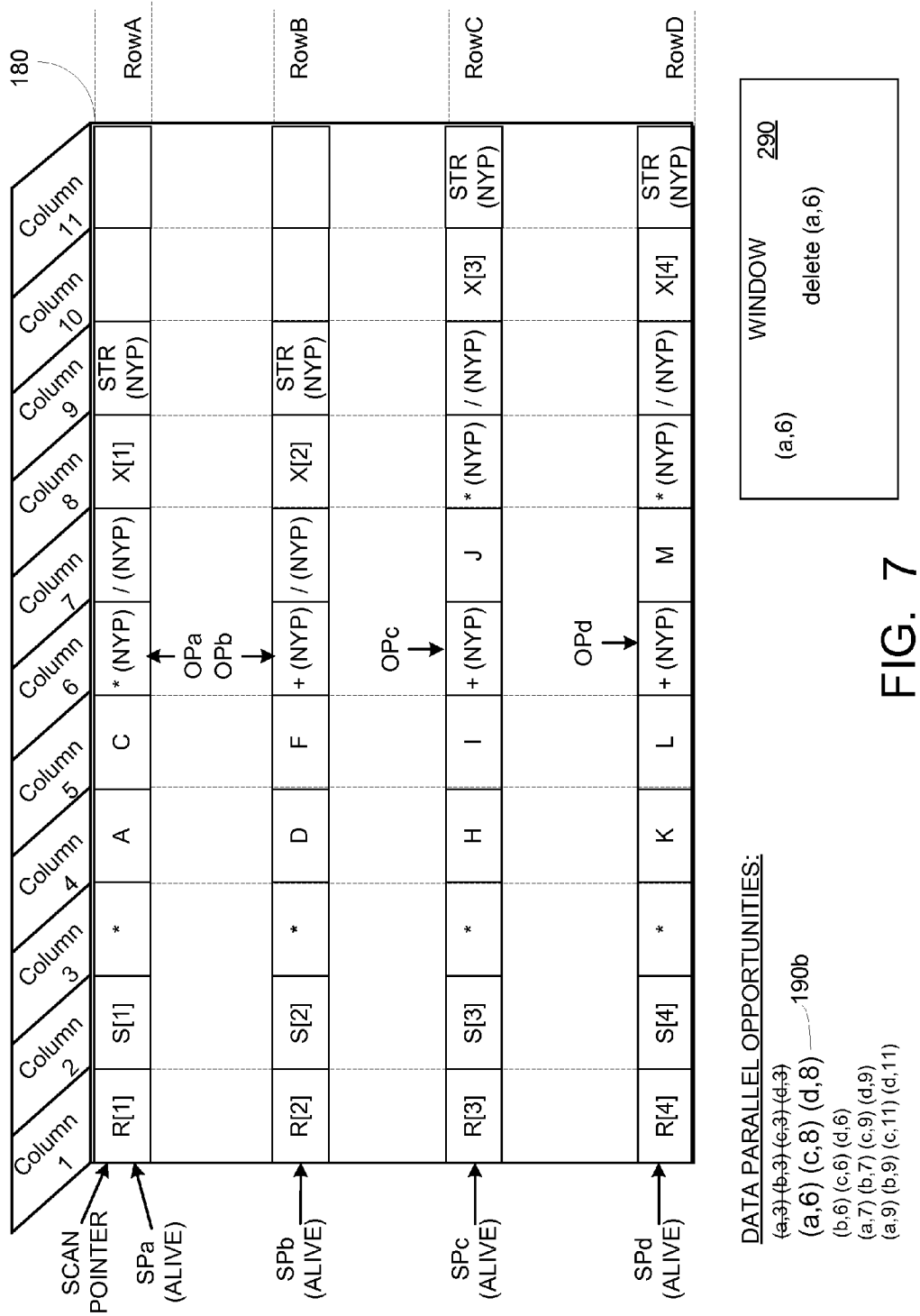

FIG. 7 depicts pack 180 after ordered selection preparation routine 230 has re-initialized the scan pointer to point to the lowest indexed statement array in pack 180 that is ALIVE, which, in this example, is still the first statement array in pack 180, re-initialized operator pointers OPa, OPb, OPc, OPd to point to the lowest indexed NYP operator of each respective statement array, which in this example have changed as a result of the prior selection search, and initialized window 290 to include the operator location of the lowest indexed NYP operator in the statement array pointed to by the scan pointer. In this example, the scan pointer is still pointing to statement array RowA, because not all operators in the statement array have been processed. Operator pointer OPa now points to the multiplication operator at location (a, 6), as the lowest indexed NYP operator in the statement array, because the preceding operator in statement array RowA, at location (a, 3) has been processed, as described above, with reference to FIG. 6. The operand data type associated with the operator (a, 6) may determine new limits on the number of statements to be searched. Because this example assumes all data types in pack 180 are integers of length four, the statement arrays RowA-RowD may all be searched by selection routine 240. The exemplary multiplication operator at location (a, 6), initialized into window 290 by ordered selection preparation routine 230, is matched to multiplication operators at locations (c, 8) and (d, 8) in the set of operator matches 190b in data parallel opportunities 190. Selection routine 240 determines that the operator at location (a, 6) has an operator match (c, 8) in data parallel opportunities 190 and that RowC is within the search limits. Because operator location (c, 8) is NOT the lowest indexed NYP operator in RowC, i.e., location (c, 8) has a column index into statement array RowC greater than the column index of the operator location pointed to by operator pointer OPc, selection routine 240 removes operator location (a, 6) from window 290, halts the selection search to prevent generating instruction that may not maintain the order of operation the original scalar code, and sets the scan pointer to point to RowC to signal ordered selection preparation routine 230 to initialize the pointers for the next search to begin on RowC.

Figure 8:
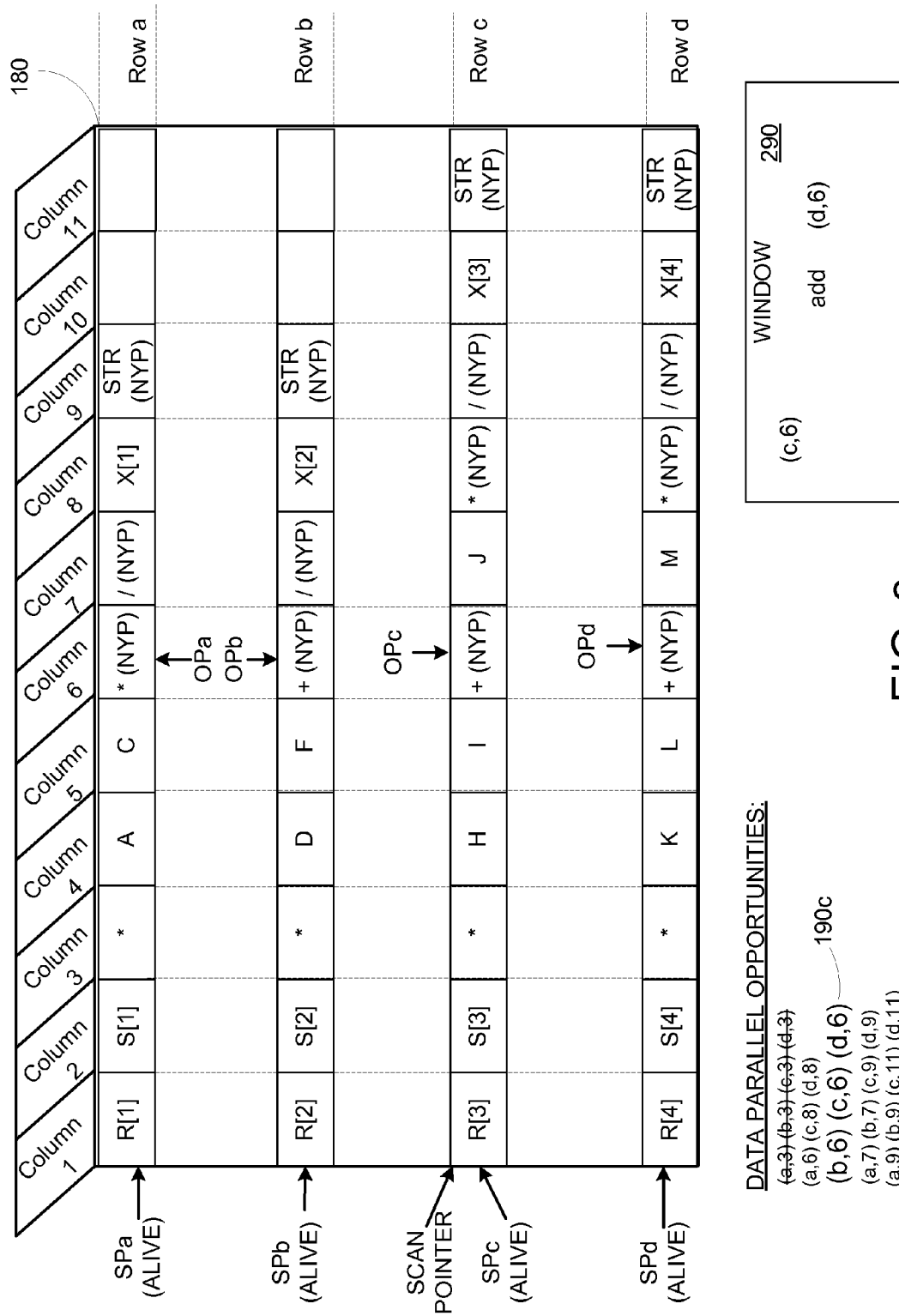

FIG. 8 depicts pack 180 after ordered selection preparation routine 230 has re-initialized the scan pointer to point to the statement array that was signaled by selection routine 240, as described above, with reference to FIG. 7. Operator pointers OPa, OPb, OPc, and OPd remain unchanged because no operators were processed by the prior selection search. Ordered selection preparation routine 230 initialized window 290 to include the operator location of the lowest indexed NYP operator in the statement array pointed to by the scan pointer. In this example, the scan pointer points to statement array RowC, the statement array that halted the prior search of pack 180. Operator pointer OPc still points to addition operator at location (c, 6), because no operators were processed in the prior selection search. The operand data type associated with the operator (c, 6) may determine new limits on the number of statements to be searched. Because this example assumes all data types in pack 180 are integers of length four, four statement arrays, beginning with RowC, may be searched. Because exemplary pack 180 has only four statement arrays, only statement arrays RowC and RowD are within the search limits. The exemplary addition operator at location (c, 6), initialized into window 290 by ordered selection preparation routine 230, is matched to addition operators at locations (b, 6) and (d, 6) in the set of operator matches 190c in data parallel opportunities 190. Selection routine 240 determines that the operator at location (c, 6) has an operator match (b, 6) in data parallel opportunities 190, but RowB is NOT within the search limits and, therefore, cannot be selected for optimization. Selection routine 240 then determines another operator match (d, 6) exists in data parallel opportunities 190, RowD is within the search limits, and operator location (d, 6) is pointed to by operator pointer OPd. Selection routine 240 adds operator location (d, 6) to window 290. Window 290 now includes two operator locations for identical operators, in this example an addition operator "+", each with operands of identical data type, for example, integer with a length of four. Window 290, though not full, is sent to code generation routine 250 to generate a SIMD instruction for the addition operators located at (c, 6) and (d, 6) in pack 180. The operators from window 290 may now all be marked as processed in pack 180.

Figure 9:
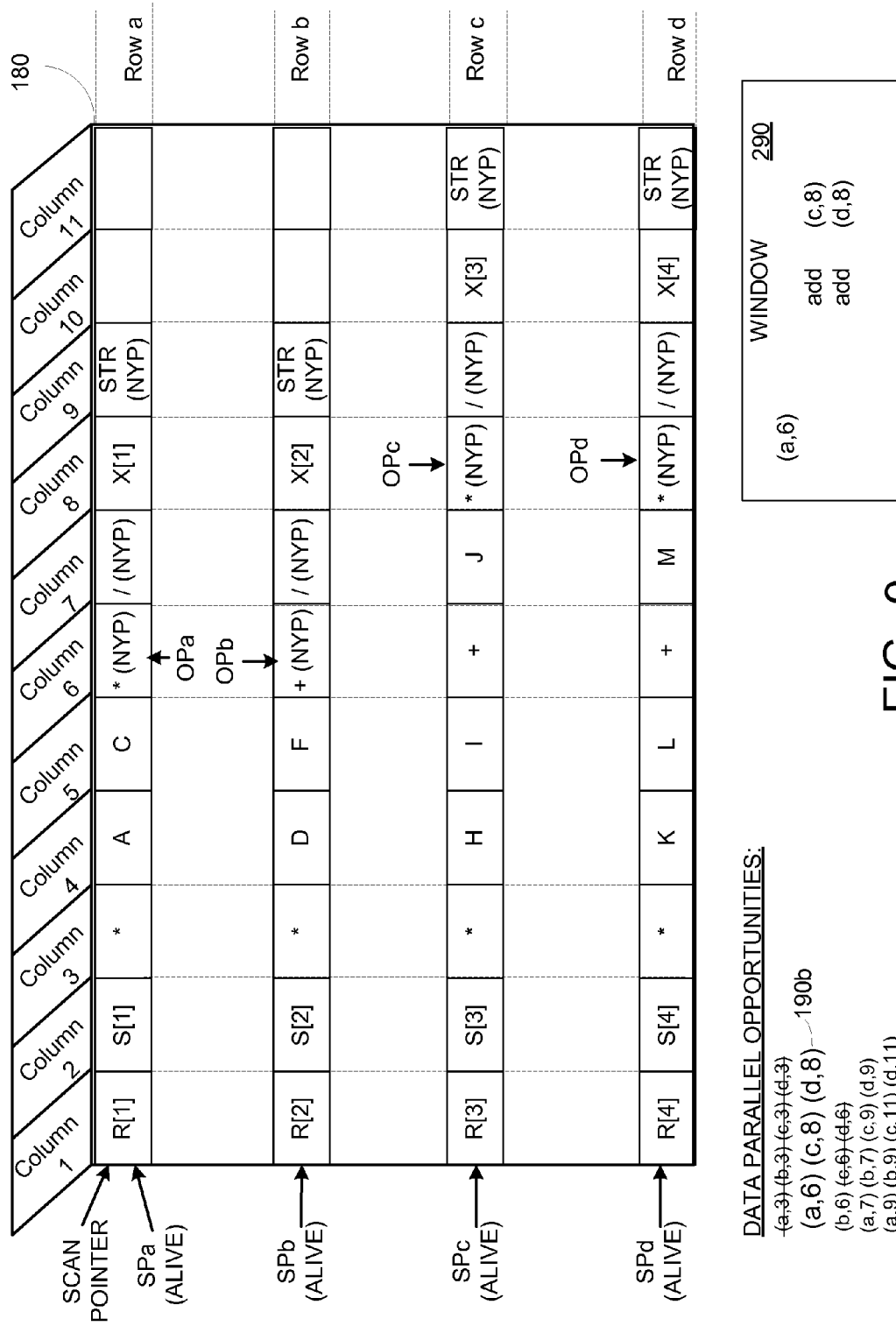

FIG. 9 depicts pack 180 after ordered selection preparation routine 230 has re-initialized the scan pointer to point to the lowest indexed statement array in pack 180 that is ALIVE, which in this example is the first statement array in pack 180, re-initialized operator pointers OPa, OPb, OPc, OPd to point to the lowest indexed NYP operator of each respective statement array, only some of which have changed in this example as a result of the prior selection search, and initialized window 290 to include the operator location of the lowest indexed NYP operator in the statement array pointed to by the scan pointer. In this example, the scan pointer is pointing to the statement array RowA, because not all operators in the statement array have been processed. Operator pointer OPa still points to the multiplication operator at location (a, 6), because this operator has not been processed in prior searches. The operand data type associated with the operator (a, 6) may determine new limits on the number of statements to be searched. Because this example assumes all data types in pack 180 are integers of length four and the search is starting at statement array RowA, the statement arrays RowA-RowD may all be searched by selection routine 240. The exemplary multiplication operator at location (a, 6), initialized into window 290 by ordered selection preparation routine 230, is matched to multiplication operators at locations (c, 8) and (d, 8) in the set of operator matches 190b in data parallel opportunities 190. Selection routine 240 determines that the operator at location (a, 6) has an operator match (c, 8) in data parallel opportunity 190 and that RowC is within the search limits. Because operator pointer OPC now points to the multiplication operator at location (c, 8) as the lowest indexed NYP operator in RowC, because the preceding operators in statement array RowC have been processed, selection routine 240 adds operator location (c, 8) to window 290. Selection routine 240 then determines another operator match (d, 8) exists in data parallel opportunities 190b. Because statement array RowD is also within the search limits and operator location (d, 8) is pointed to by operator pointer OPd, selection routine 240 adds operator location (d, 8) to window 290. Window 290 now includes three operator locations for identical operators, in this example a multiplication operator "*", each with operands of identical data type, for example, integer with a length of four. Window 290 is sent to code generation routine 250 to generate a SIMD instruction for the multiplication operators located at (a, 6), (c, 8), and (d, 8) in pack 180. The operators from window 290 may now all be marked as processed in pack 180.

Figure 10:
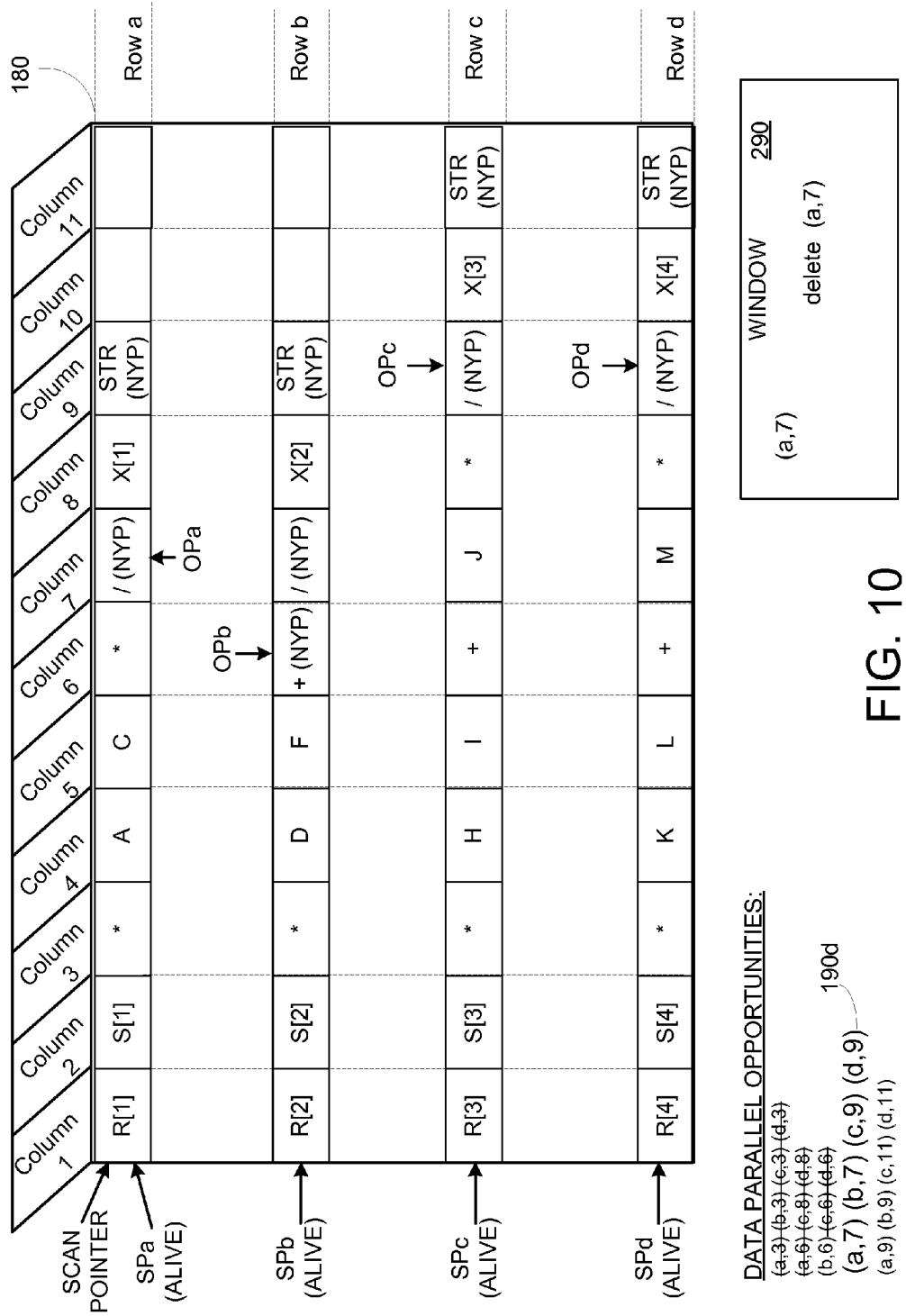

FIG. 10 depicts pack 180 after ordered selection preparation routine 230 has re-initialized the scan pointer to point to the lowest indexed statement array in pack 180 that is ALIVE, which, in this example, is still the first statement array in pack 180, re-initialized operator pointers OPa, OPb, OPc, OPd to point to the lowest indexed NYP operator of each respective statement array, only some of which have changed in this example as a result of the prior selection search, and initialized window 290 to include the operator location of the lowest indexed NYP operator in the statement array pointed to by the scan pointer. In this example, the scan pointer continues to point to statement array RowA because not all operators in the statement array have been processed. Operator pointer OPa now points to the division operator at location (a, 7) as the lowest indexed NYP operator in the statement array, because the preceding operators in statement array RowA has been processed as described above. The operand data type associated with the operator (a, 7) may determine new limits on the number of statements to be searched. Because this example assumes all data types in pack 180 are integers of length four and the search is starting at statement array RowA, the statement arrays represented by RowA-RowD may all be searched by selection routine 240. The exemplary division operator at location (a, 7), initialized into window 290 by ordered selection preparation routine 230, is matched to division operators at locations (b, 7), (c, 9), and (d, 9) in the set of operator matches 190d in data parallel opportunities 190. Selection routine 240 determines that the operator at location (a, 7) has an operator match (b, 7) in data parallel opportunities 190 and that RowB is within the search limits. Because operator location (b, 7) is NOT the lowest indexed NYP operator in RowB, i.e., location (b, 7) has a column index into statement array RowB greater than the column index of the operator location pointed to by operator pointer OPb, selection routine 240 removes operator location (a, 7) from window 290, halts the selection search to prevent generating instruction that may not maintain the order of operation the original scalar code, and sets the scan pointer to point to RowB to signal ordered selection preparation routine 230 to initialize the pointers for the next search to begin on RowB.

Figure 11:
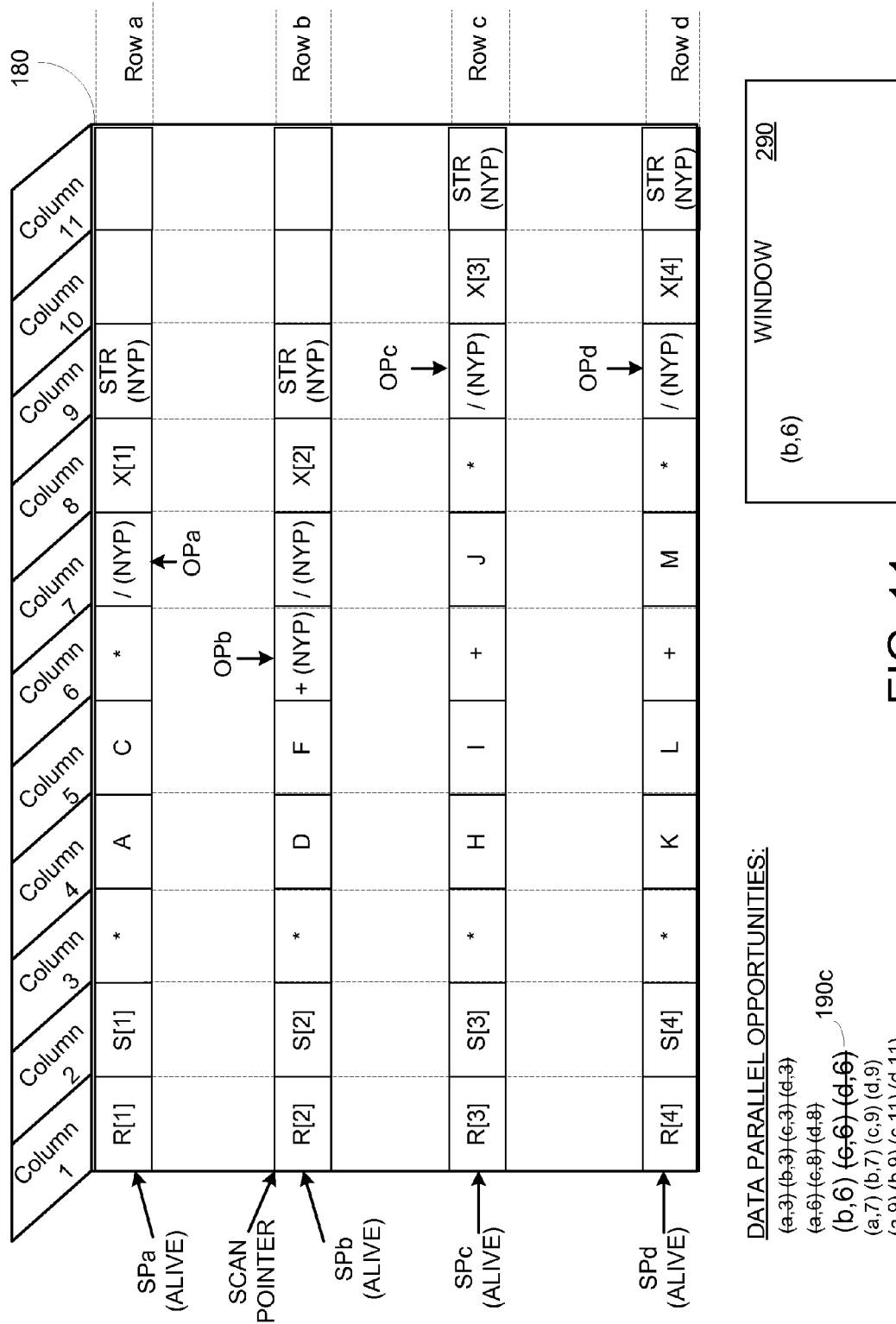

FIG. 11 depicts pack 180 after ordered selection preparation routine 230 has re-initialized the scan pointer to point to the statement array that was signaled by selection routine 240, as described above with reference to FIG. 10. Operator pointers OPa, OPb, OPc, and OPd remain unchanged because no operators were processed by the prior selection search. Ordered selection preparation routine 230 initialized window 290 to include the operator location of the lowest indexed NYP operator in the statement array pointed to by the scan pointer. In this example, the scan pointer points to statement array RowB, the statement array that halted the prior search of pack 180. Operator pointer OPb still points to addition operator at location (b, 6), because no operators were processed in the prior selection search. The operand data type associated with the operator (b, 6) may determine new limits on the number of statements to be searched. Because this example assumes all data types in pack 180 are integers of length four, four statement arrays, beginning with RowB, may be searched. Because exemplary pack 180 has only four statement arrays, only statement arrays RowB-RowD are within the search limits. The exemplary addition operator at location (b, 6), initialized into window 290 by ordered selection preparation routine 230, is matched to addition operators at locations (c, 6) and (d, 6) in the set of operator matches 190c in data parallel opportunities 190. Selection routine 240 determines that the operator at location (b, 6) has an operator match (c, 6) in data parallel opportunities 190 and RowC is within the search limits. Because the operator at location (c, 6) has already been processed, it's location is NOT the lowest indexed NYP operator in RowC, i.e., location (c, 6) has a column index into the statement array RowC smaller than the column index of the operator location pointed to by operator pointer OPc. Selection routine 240 then determines another operator match (d, 6) exists in data parallel opportunities 190, RowD is within the search limits but determine, that like operator location (c, 6), operator location (d, 6) has also been processed in a prior search. Window 290 includes only one operator location (b, 6), in this example an addition operator "+". Window 290, though not full, is sent to code generation routine 250 to generate a SIMD (or scalar) instruction for the addition operator located at (b, 6) in pack 180. The operator from window 290 may now be marked as processed in pack 180.

Figure 12:
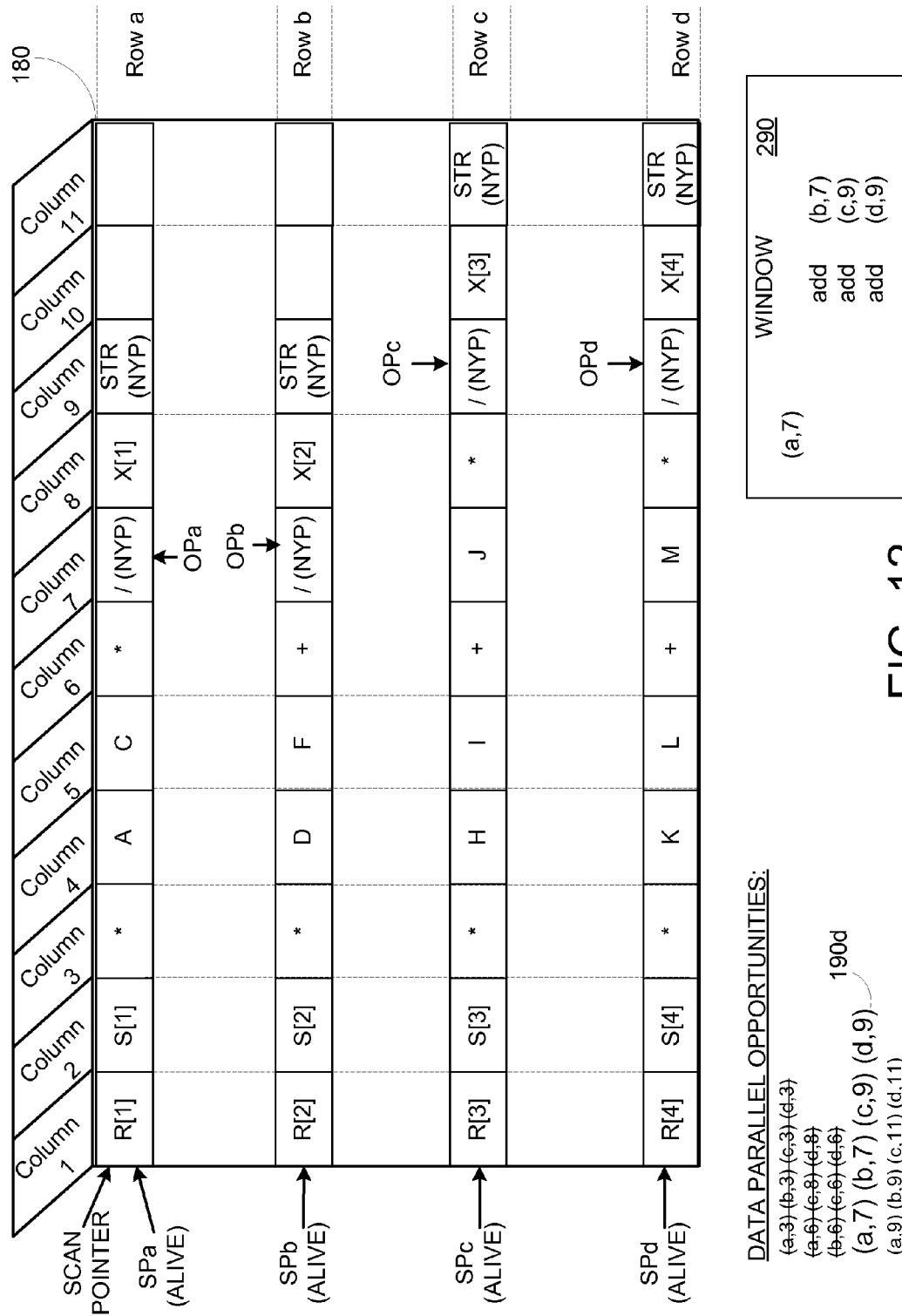
Figure 13:
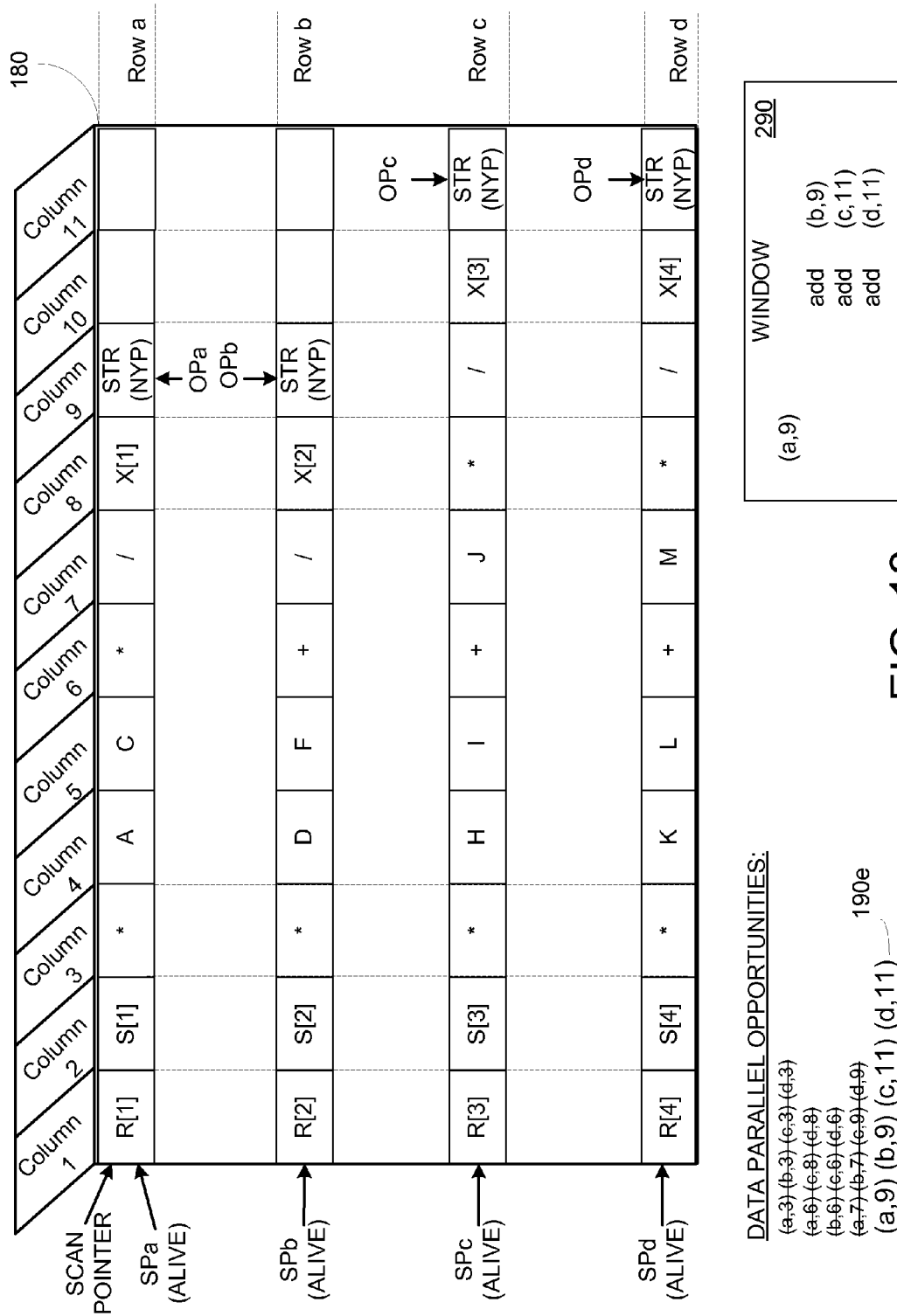
Figure 14:
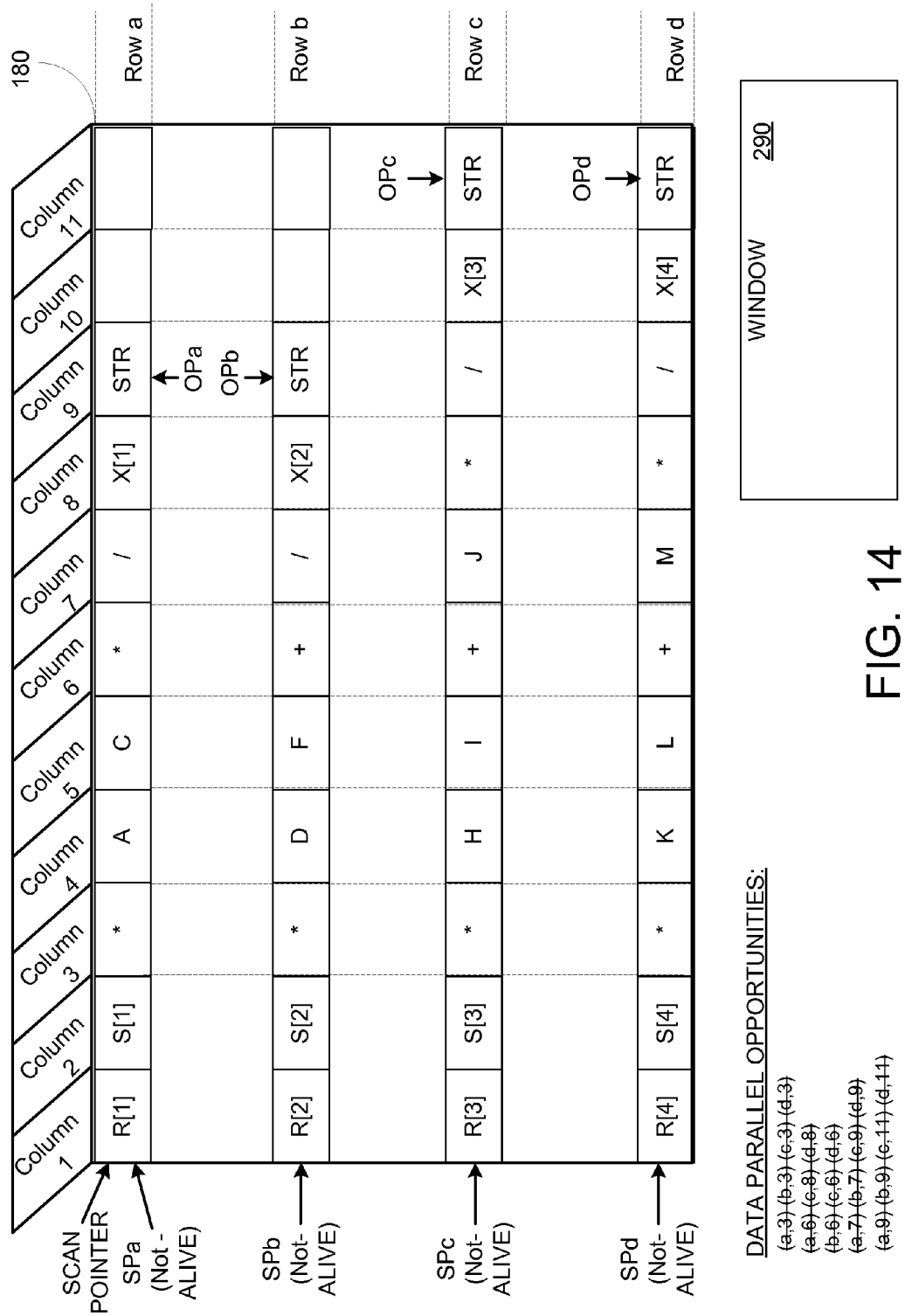

FIGS. 12 and 13 continue to depict pack 180 after ordered selection preparation routine 230 has re-initialized the scan pointer to point to the lowest indexed statement array in pack 180 that is ALIVE, which in both FIG. 13 and FIG. 14 is still the first statement array in pack 180, re-initialized operator pointers OPa, OPb, OPc, OPd to point to the lowest indexed NYP operator of each respective statement array, and initialized window 290 to include the operator location of the lowest indexed NYP operator in the statement array pointed to by the scan pointer, operator location (a, 7) (FIG. 12) and operator location (a, 9) (FIG. 13).

FIG. 14 depicts pack 180 as it may appear after all operators have been processed and optimized code generated for all the scalar code statements 110 represented by pack 180.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 15 depicts a block diagram of components of the computing device 222 of the SIMD optimizing environment 299 of FIG. 2, in accordance with an embodiment of the present invention. It should be appreciated that FIG. 15 provides only an illustration of one implementation and does not imply any limitations with regard to the environments in which different embodiments may be implemented. Many modifications to the depicted environment may be made.

Computing device 222 can include one or more processors 1520, one or more computer-readable RAMs 1522, one or more computer-readable ROMs 1524, one or more SIMD processing elements 1545, one or more tangible storage devices 1530, device drivers 1540, read/write drive or interface 1532, and network adapter or interface 1536, all interconnected over a communications fabric 1526. Communications fabric 1526 can be implemented with any architecture designed for passing data and/or control information between processors (such as microprocessors, communications and network processors, etc.), system memory, peripheral devices, and any other hardware components within a system.

One or more operating systems 1528, compilers 200, scalar code statements 110 (FIG. 2), data parallel opportunities 190 (FIG. 2), generated SIMD instructions 295 (FIG. 2), and window 290 (FIG. 2) are stored on one or more of the computer-readable tangible storage devices 1530 for execution by one or more of the processors 1520 via one or more of the respective RAMs 1522 (which typically include cache memory). In the illustrated embodiment, each of the computer-readable tangible storage devices 1530 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 222 can also include a R/W drive or interface 1532 to read from and write to one or more portable computer-readable tangible storage devices 1570. Compiler 200, scalar code statements 110 (FIG. 2), data parallel opportunities 190 (FIG. 2), generated SIMD instructions 295 (FIG. 2), and window 290 (FIG. 2) on computing device 222 can be stored on one or more of the portable computer-readable tangible storage devices 1570, read via the respective R/W drive or interface 1532, and loaded into the respective computer-readable tangible storage device 1530.

Computing device 222 can also include a network adapter or interface 1536, such as a TCP/IP adapter card or wireless communication adapter (such as a 4G wireless communication adapter using OFDMA technology). Compiler 200 on computing device 222 can be downloaded to the computing device from an external computer or external storage device via a network (for example, the Internet, a local area network or other, wide area network or wireless network) and network adapter or interface 1536. From the network adapter or interface 1536, the programs are loaded into the computer-readable tangible storage device 1530. The network may comprise copper wires, optical fibers, wireless transmission, routers, firewalls, switches, gateway computers, and/or edge servers.

Computing device 222 can also include a display screen 1550, a keyboard or keypad 1560, and a computer mouse or touchpad 1555. Device drivers 1540 interface to display screen 1550 for imaging, to keyboard or keypad 1560, to computer mouse or touchpad 1555, and/or to display screen 1550 for pressure sensing of alphanumeric character entry and user selections. The device drivers 1540, R/W drive or interface 1532, and network adapter or interface 1536 can comprise hardware and software (stored in computer-readable tangible storage device 1530 and/or ROM 1524).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method to generate Single Instruction Multiple Data (SIMD) code from code statements that include non-isomorphic code statements, the method comprising:

receiving, by one or more processors, a plurality of code statements, each code statement having one or more operators in a respective operator order, each operator having a type and associated operands, wherein operands include: linearized address expressions, non-linearized address expressions, memory adjacent operands, and non-memory adjacent operands, and at least two code statements of the plurality of code statements having an operator of the same type in a different operator order position;

identifying, by the one or more processors, a first operator order position for the operators of the same type in each of the at least two code statements;

for each of the at least two code statements, generating, by the one or more processors, compiled code for operators and their associated operands having operator order positions preceding the first operator order positions; and generating, by the one or more processors, SIMD code from the compiled code at least based on the identified first operator order positions, the corresponding operator type, and the operands associated with the operator type at the identified operator order positions.

2. A method in accordance with claim 1, wherein generating code for operators and their associated operands comprises:

identifying a second operator order position preceding the first operator order position;

identifying a third operator order position for operators having an operator type corresponding to the second operator order position in each of the at least two code statements;

for each of the at least two code statements, generating code for operators and their associated operands having operator order positions preceding the third operator order positions; and generating SIMD code at least based on the identified second and third operator order positions, the corresponding operator type, and the operands associated with the operator type at the identified operator order positions.

3. A method in accordance with claim 1, wherein generating code for operators and their associated operands further comprises generating SIMD code.

4. A method in accordance with claim 1, wherein operator order includes one of: operator precedence order, and operator positional order in a statement.

5. A method in accordance with claim 1, wherein operators include: addition and subtraction operators, multiplication and division operators, store operators, conversion operators.

* * * * *